United States Patent
Takabayashi et al.

(10) Patent No.: US 11,283,140 B2
(45) Date of Patent: Mar. 22, 2022

(54) SECONDARY BATTERY INCLUDING TERMINAL HAVING FIRST REGION FORMED OF MATERIAL WITH DIFFERENT IONIZATION TENDENCY THAN MATERIAL OF SECOND REGION OF TERMINAL

(71) Applicant: SANYO Electric Co., Ltd., Daito (JP)

(72) Inventors: Hiroshi Takabayashi, Hyogo (JP); Yohei Muroya, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 147 days.

(21) Appl. No.: 16/549,302

(22) Filed: Aug. 23, 2019

(65) Prior Publication Data

US 2020/0075923 A1 Mar. 5, 2020

(30) Foreign Application Priority Data

Aug. 31, 2018 (JP) .............................. JP2018-162756

(51) Int. Cl.
*H01M 50/543* (2021.01)
*H01M 50/183* (2021.01)

(52) U.S. Cl.
CPC ....... *H01M 50/543* (2021.01); *H01M 50/183* (2021.01)

(58) Field of Classification Search
CPC .......................... H01M 50/543; H01M 50/183
USPC ................................................... 429/178, 181
See application file for complete search history.

(56) References Cited

U.S. PATENT DOCUMENTS

| | | | |
|---|---|---|---|
| 2011/0081572 A1* | 4/2011 | Byun | H01M 50/531 429/178 |
| 2012/0021278 A1* | 1/2012 | Byun | H01M 50/561 429/179 |
| 2013/0196219 A1* | 8/2013 | Kim | H01M 10/0431 429/179 |
| 2015/0086857 A1* | 3/2015 | Moon | H01M 50/543 429/178 |
| 2015/0086867 A1* | 3/2015 | Oda | H01M 50/543 429/211 |
| 2016/0118641 A1* | 4/2016 | Oda | H01M 50/543 429/211 |
| 2016/0276645 A1* | 9/2016 | Koo | H01M 50/543 |
| 2017/0054131 A1 | 2/2017 | Yokota et al. | |
| 2017/0149043 A1* | 5/2017 | Koo | H01M 50/183 |
| 2017/0149044 A1* | 5/2017 | Koo | H01M 50/543 |
| 2018/0083302 A1* | 3/2018 | Koo | H01M 10/04 |

FOREIGN PATENT DOCUMENTS

| | | |
|---|---|---|
| JP | 2017-41299 A | 2/2017 |
| JP | 2018-55799 A | 4/2018 |

* cited by examiner

*Primary Examiner* — Sean P Cullen
(74) *Attorney, Agent, or Firm* — Westerman, Hattori, Daniels & Adrian, LLP

(57) ABSTRACT

A negative electrode includes a first region formed of a first material and a second region formed of a second material having a different ionization tendency from the first material. The negative electrode terminal includes a flange that is disposed so as to face the outer surface of a sealing plate. A sealing plate side insulating member is disposed between the flange and the sealing plate. A boundary between the first region and the second region has an exposed part that is exposed to the outside, and the exposed part is positioned at an opposite corner on the periphery of the flange to the sealing plate.

10 Claims, 8 Drawing Sheets

SECONDARY BATTERY INCLUDING TERMINAL HAVING FIRST REGION FORMED OF MATERIAL WITH DIFFERENT IONIZATION TENDENCY THAN MATERIAL OF SECOND REGION OF TERMINAL

CROSS REFERENCE TO RELATED APPLICATIONS

The present invention application claims priority to Japanese Patent Application No. 2018-162756 filed in the Japan Patent Office on Aug. 31, 2018, the entire contents of which are incorporated herein by reference.

BACKGROUND OF THE INVENTION

Field of the Invention

The present disclosure relates to a secondary battery.

Description of Related Art

Japanese Published Unexamined Patent Application No. 2017-41299 (Patent Document 1) discloses a typical secondary battery in its FIG. 4. This secondary battery includes an exterior package that has a substantially cuboid recess and a sealing plate that seals an opening. The sealing plate has a pair of through-holes, and negative electrode terminal has been inserted into one of the through-holes. The negative electrode terminal has a first region formed of aluminum and a second region formed of copper. The second region is on the recess side relative to the first region in the height direction, and the upper end surface of the second region joins the lower end surface of the first region in the height direction. The boundary between the first region and the second region overlies the upper surface of the sealing plate, the joint part has an exposed part that is exposed to the outside on the side surface of the negative electrode terminal.

In such a secondary battery, the negative electrode terminal has the first region formed of aluminum on the upper side thereof in the height direction and can be therefore readily welded to a light aluminum bus bar, which enables a reduction in the weight of the bus bar.

A salt spray test, in which salt water is sprayed on a secondary battery, is performed to examine the corrosion of the secondary battery, and it is found that some of the salt water adheres to the exposed part in the negative electrode terminal. Some adhering salt water causes galvanic corrosion, and aluminum having a higher ionization tendency than copper is dissolved into the salt water around the exposed part in the negative electrode, which promotes the corrosion of the part formed of aluminum around the exposed part.

BRIEF SUMMARY OF THE INVENTION

It is an object of the present disclosure to provide a secondary battery that includes a terminal having two or more regions formed of different materials and that enables a reduction in the corrosion of the terminal around the boundary between the different regions.

In order to address the above-mentioned problem, a secondary battery according to an aspect of the present disclosure includes an exterior package having an opening at one end in a height direction, a sealing plate that seals the opening and that has a through-hole, an electrode body that is disposed inside the exterior package and that includes a positive electrode and a negative electrode, and a terminal that is inserted into the through-hole to be electrically connected to the positive electrode or the negative electrode, wherein the terminal has a first region formed of a first material and a second region formed of a second material having a different ionization tendency from the first material; the terminal has a flange having an outer diameter larger than the inner diameter of the through-hole; the flange is disposed so as to face the outer surface of the sealing plate; an insulating member is disposed between the flange and the outer surface of the sealing plate; and a boundary between the first region and the second region has an exposed part that is exposed to the outside, and the exposed part is positioned at an opposite corner on the periphery of the flange to the sealing plate.

The term "corner" herein refers to a vicinity of the part at which the upper surface of the flange joins the side surface of the flange. In particular, the corner can be a region within 2 mm from the part at which the upper surface of the flange joins the side surface of the flange.

A secondary battery according to another aspect of the present disclosure includes an exterior package having an opening at one end in a height direction, a sealing plate that seals the opening and that has a through-hole, an electrode body that is disposed inside the exterior package and that includes a positive electrode and a negative electrode, and a terminal that is inserted into the through-hole to be electrically connected to the positive electrode or the negative electrode, wherein the terminal has a first region formed of a first material and a second region formed of a second material having a different ionization tendency from the first material; the terminal has a flange having an outer diameter larger than the inner diameter of the through-hole; the flange is disposed so as to face the outer surface of the sealing plate; an insulating member is disposed between the flange and the outer surface of the sealing plate; the insulating member has a base disposed along the outer surface of the sealing plate and a protruding insulating part that protrudes from the base and that faces the side surface of the flange; a boundary between the first region and the second region has an exposed part that is exposed to the outside, and the exposed part is positioned on the side surface of the flange; and the exposed part is positioned on the upper surface side of the flange relative to an end of the protruding insulating part that is on the upper surface side of the flange.

A secondary battery according to the present disclosure includes a terminal having two or more regions formed of different materials and enables a reduction in the corrosion of the terminal around the boundary between the different regions.

DETAILED DESCRIPTION OF THE INVENTION

Figure 1:
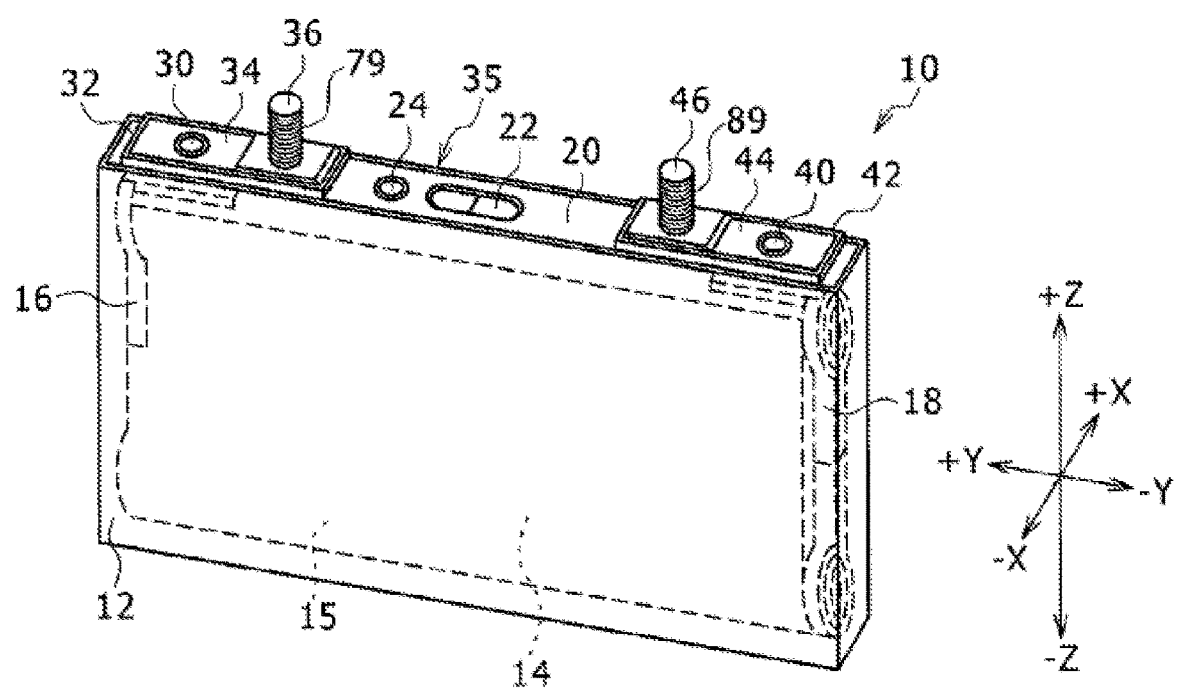
FIG. 1 is a perspective view illustrating a secondary battery according to an embodiment of the present disclosure.

An embodiment according to the present disclosure will now be described in detail with reference to the accompanying drawings. In the case where the following description includes different embodiments and modifications, appropriately combining the characteristic parts thereof into another embodiment is taken into account from the beginning. In the embodiment that will be described below, the identical parts are denoted by the same reference signs in the drawings, and the repeated description thereof is omitted. Furthermore, the drawings include some schematic view, and the dimensional relationships in the depth, width, and height of components between the individual drawings are therefore not always the same. Although an example in which a secondary battery is a quadrangular lithium-ion battery will be described below, the secondary battery does not need to be quadrangular and may have a cylindrical shape or another shape. The secondary battery may be a rechargeable battery other than the lithium ion battery, such as a metallic lithium battery, a nickel cadmium battery, a nickel hydrogen battery, or a sodium ion battery. In the following description and the drawings, directions in the thickness of the quadrangular secondary battery are defined as X directions, a +X direction refers to one of the X directions, and a −X direction refers to the other opposite one of the X directions. In addition, directions in the width of the quadrangular secondary battery are defined as Y directions, a +Y direction refers to the direction from a negative electrode terminal to a positive electrode terminal among the Y directions, and a −Y direction refers to the direction from the positive electrode terminal to the negative electrode terminal among the Y directions. Moreover, directions in the height of the quadrangular secondary battery are defined as Z directions, a +Z direction refers to the direction from the bottom side to the terminal side among the Z directions, and a −Z direction refers to the direction from the terminal side to the bottom side among the Z directions. The X directions, the Y directions, and the Z directions are orthogonal to each other. On the periphery of a flange in the following description, a corner opposite to a sealing plate refers to the vicinity of the part at which the upper surface of the flange joins the side surface of the flange; in particular, it can be defined as a region within 2 mm from the part at which the upper surface of the flange joins the side surface of the flange (circumferential surface).

A secondary battery 10 is a quadrangular lithium-ion battery having a substantially cuboid shape as illustrated in FIG. 1. The secondary battery 10 includes an exterior package 12, an electrode body 14, and a non-aqueous electrolytic solution; and the electrode body 14 and the non-aqueous electrolytic solution are held inside the exterior package 12, specifically inside a substantially cuboid recess 15 defined by the exterior package 12.

Specifically, the exterior package 12 has an opened end in the +Z direction that is one of the Z directions and is, for example, formed of a metal material in a predetermined shape; in particular, the metal material can be suitably an aluminum metal (such as aluminum or an aluminum alloy) or an iron metal (such as iron or an alloy mainly containing iron). The electrode body 14 has a flat shape and a winding structure in which the positive electrode and the negative electrode are wound with a separator interposed therebetween. The end of the electrode body 14 in the +Y direction is electrically connected to a positive electrode current collector 16, and the end of the electrode body 14 in the −Y direction is electrically connected to a negative electrode current collector 18. Although the electrode body has a winding structure in this embodiment, the electrode body may have a layered structure in which the positive electrode and the negative electrode are alternately disposed with a separator interposed therebetween.

The positive electrode includes metal foil as a positive electrode core and positive electrode active material layers formed on the both sides of the metal foil. The positive electrode core is preferably metal foil containing aluminum, and preferred examples thereof include metal foil of aluminum and metal foil of aluminum alloys. The positive electrode active material contains a lithium transition metal oxide that can store and discharge lithium ions. The negative electrode includes metal foil as a negative electrode core and negative electrode active material layers formed on the both sides of the metal foil. The negative electrode core is preferably metal foil containing copper, and preferred examples thereof include metal foil of copper and metal foil of copper alloys. The negative electrode active material is, for example, made of a carbonaceous material or silicon material. The separator is, for instance, an ion-permeable porous membrane.

The non-aqueous electrolytic solution, for example, contains ethylene carbonate (EC), ethyl methyl carbonate (EMC), or dimethyl carbonate (DMC) as a non-aqueous solvent; and an electrolytic salt, such as lithium hexafluorophosphate (LiPF6), is added to the non-aqueous solvent to produce a suitable non-aqueous electrolytic solution. These compositions are merely an example, and different compositions can be used on the basis of the structure of the secondary battery 10.

The positive electrode current collector 16 is a conductive lead terminal member exposed to the end of the electrode body 14 in the +Y direction and connected to the positive electrode core; for example, the positive electrode current collector 16 is formed by processing an aluminum metal plate. The positive electrode current collector 16 is connected to the positive electrode core by welding. The negative electrode current collector 18 is a conductive lead terminal member exposed to the end of the electrode body 14 in the −Y direction and connected to the negative electrode core; for example, the negative electrode current collector 18 is formed by processing a copper metal plate. The negative electrode current collector 18 is connected to the negative electrode core by welding.

The secondary battery 10 further includes a sealing plate 20 that is combined with the exterior package 12 into a housing (case) 35. The sealing plate 20 is disposed on the +Z side end of the exterior package 12 to seal the opening of the exterior package 12 and integrated with the exterior package 12 by being welded. The electrode body 14, the positive electrode current collector 16, and the negative electrode current collector 18 are accommodated in the housing 35. The sealing plate 20 has an exhaust valve 22, a liquid injection hole, and a sealing stopper 24 that seals the liquid injection hole. The exhaust valve 22 serves to relieve the inner pressure of the housing 35 when the inner pressure exceeds a threshold pressure. The liquid injection hole serves to inject the non-aqueous electrolytic solution into the housing 35, and the sealing stopper 24 seals the liquid injection hole after the injection of the non-aqueous electrolytic solution. The sealing plate 20 is, for instance, an aluminum plate processed into a predetermined shape.

The secondary battery 10 has a positive electrode terminal 30 disposed at the end of the sealing plate 20 in the +Y direction. The positive electrode terminal 30 is electrically insulated from the sealing plate 20 via a positive electrode side insulating member 32 formed of resin. The positive electrode terminal 30 is electrically connected to the positive electrode core of the electrode body 14. Specifically, the positive electrode terminal 30 is inserted into a positive electrode terminal attachment hole formed in the sealing plate 20 and electrically connected to the positive electrode current collector 16 electrically connected to the positive electrode core. The positive electrode terminal 30 is electrically connected to an external conductive member 34 outside the secondary battery 10. The secondary battery 10 further includes a bolt 36 spaced apart from the positive electrode terminal 30 on the external conductive member 34, and the bolt 36 is electrically connected to the external conductive member 34. The connection between the positive electrode terminal 30 and the positive electrode current collector 16 will be described in detail later.

The secondary battery 10 has a negative electrode terminal 40 disposed at the end of the sealing plate 20 in the −Y direction. The negative electrode terminal 40 is electrically insulated from the sealing plate 20 via a negative electrode side insulating member 42 formed of resin. The negative electrode terminal 40 is electrically connected to the negative electrode core of the electrode body 14. Specifically, the negative electrode terminal 40 is inserted into a negative electrode terminal attachment hole formed in the sealing plate 20 and electrically connected to the negative electrode current collector 18 electrically connected to the negative electrode core. The negative electrode terminal 40 is electrically connected to an external conductive member 44 outside the secondary battery 10. The secondary battery 10 further includes a bolt 46 spaced apart from the negative electrode terminal 40 on the external conductive member 44, and the bolt 46 is electrically connected to the external conductive member 44.

Figure 2:
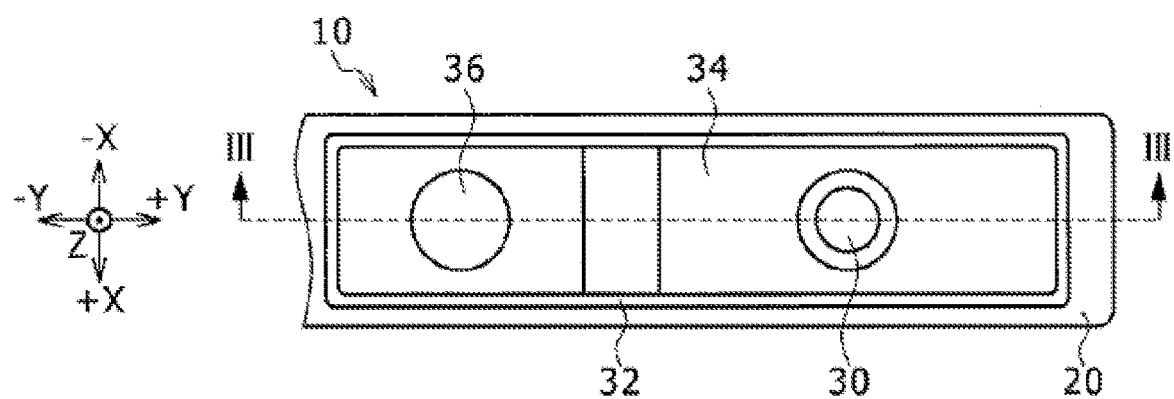
FIG. 2 is an enlarged top view partially illustrating the positive electrode terminal side of the secondary battery.
Figure 3A:
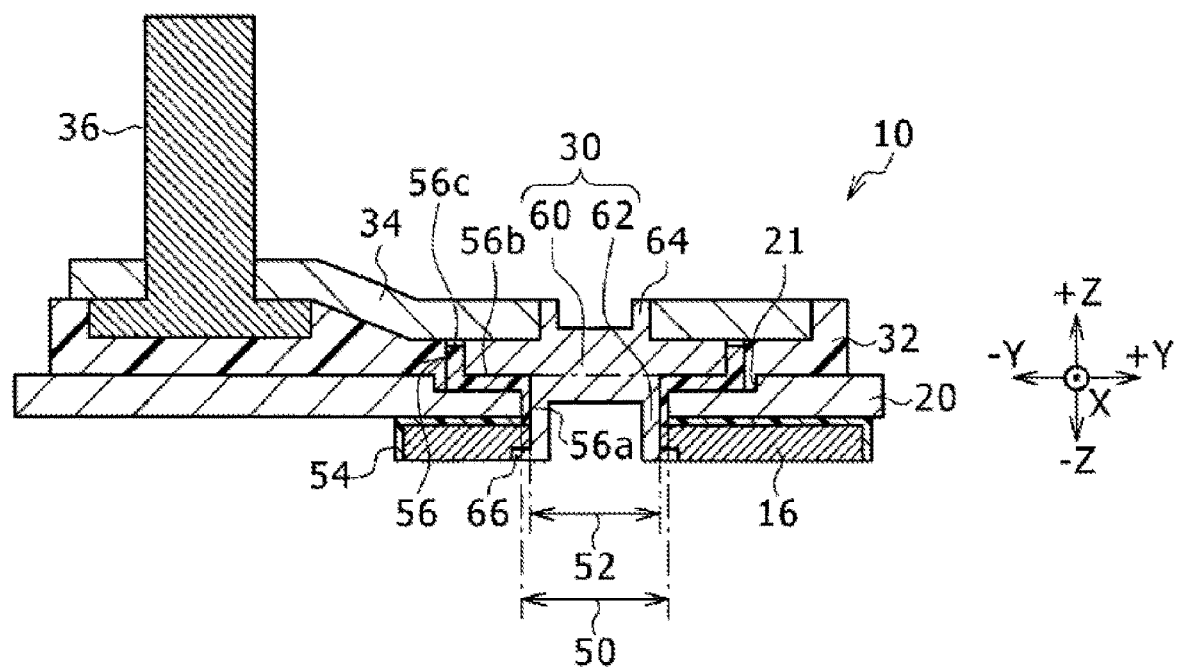
FIG. 3A is a cross sectional view taken along the line III-III in FIG. 2 and illustrating a state before a positive electrode terminal is welded to a positive electrode side exterior conductive member.

Attaching the positive electrode terminal 30 and the negative electrode terminal 40 to the sealing plate 20 will now be described with reference to FIGS. 2 to 7. The connection structure on the positive electrode terminal 30 side will be described. In the secondary battery 10, the positive electrode side insulating member 32, the positive electrode side external conductive member 34, and the positive electrode side bolt 36 are disposed on the +Z side and on the positive electrode terminal 30 side in the Y directions as illustrated in FIG. 2. The sealing plate 20 has a positive electrode terminal attachment hole 50 as illustrated in FIG. 3A, and the positive electrode terminal 30 is inserted into the positive electrode terminal attachment hole 50. The sealing plate 20 has a recess 21 that opens in the +Z direction. The recess 21 is formed at the periphery of the positive electrode terminal attachment hole 50 so as to be in communication with the upper part of the positive electrode terminal attachment hole 50 and expands outward from the upper part of the positive electrode terminal attachment hole 50 in the diameter direction. Part of the positive electrode side insulating member 32 is placed on the recess 21. The recess 21 is not an essential constituent, and the positive electrode side insulating member 32 does not need to have the part that is placed on the recess 21.

The positive electrode current collector 16 has a current collector through-hole 52, and the positive electrode terminal 30 is inserted into the current collector through-hole 52. The central axis of the positive electrode terminal attachment hole 50 and the central axis of the current collector through hole 52 are aligned with each other in an assembling process. The positive electrode terminal 30 includes a flange 60 and a circular insertion part 62 disposed on the Z side relative to the flange 60. The outer diameter of the flange 60 is larger than the inner diameter of the positive electrode terminal attachment hole 50. The flange 60 is a brim-like part of the positive electrode terminal 30 that is disposed so as to face the outer surface of the sealing plate 20. The outer diameter of the flange 60 is smaller than the inner diameter of the recess 21 of the sealing plate 20; viewed in the Z direction, the whole body of the flange 60 is within the recess 21. Part of the positive electrode terminal 30 on the Z side of the flange 60 includes the circular insertion part 62 and is inserted into the positive electrode terminal attachment hole 50 and the current collector through hole 52. The end face of the flange 60 on the −Z side is represented by a dashed line. The same holds true for the subsequent drawing.

The other side of the flange 60, which is the +Z side, has a protrusion 64, and the protrusion 64 is a welding terminal that serves to weld the positive electrode terminal 30 to the positive electrode side external conductive member 34. Although the positive electrode terminal 30 has the circular protrusion 64 in the embodiment illustrated in FIG. 3A, multiple protrusions may be provided on the same circumference so as to be spaced apart from each other in the circumferential direction, or the protrusion may have a columnar shape of which the upper surface does not have a recess. Alternatively, the protrusion 64 is not necessarily provided. The insertion part 62 has an end 66 in the −Z direction, and the end 66 is swaged so as to expand its diameter and has a circular part that is on the positive electrode current collector 16 when it is viewed in the Z directions. This structure enables the positive electrode terminal 30 and the positive electrode current collector 16 to be in fixed connection with the sealing plate 20. The swaged end 66 is preferably welded to the positive electrode current collector 16. The insertion part 62 does not need to be circular and may have a columnar shape having no recess.

The secondary battery 10 further includes a current collector side insulator 54 and a sealing plate side insulator 56. The current collector side insulator 54 is a pair of insulating members that electrically insulate the positive electrode current collector 16 from the sealing plate 20. The current collector side insulator 54 covers the +Z side end face of the positive electrode current collector 16 and the circumferential surface of the positive electrode current collector 16 as illustrated in FIG. 3A. The current collector side insulator 54 may be a resin member or may be a member formed by coating the intended part of the positive electrode current collector 16 with resin.

The sealing plate side insulator 56 is an integrated insulating member that electrically insulates the positive electrode terminal 30 from the sealing plate 20. The sealing plate side insulator 56 includes an inner surface covering part 56a, a base 56b, and protruding insulating part 56c. The inner surface covering part 56a has a cylindrical shape and covers the inner surface of the positive electrode terminal attachment hole 50 of the sealing plate 20. The inner surface covering part 56a prevents the positive electrode terminal 30 from being electrically connected to the inner surface of the positive electrode terminal attachment hole 50 of the sealing plate 20. The base 56b extends outward from the +Z side end of the inner surface covering part 56a in the diameter direction and is disposed along the outer surface of the sealing plate 20. The base 56b is disposed on the bottom of the recess 21. The base 56b is disposed between the flange 60 and the outer surface of the sealing plate 20 (upper surface in the +Z direction) and prevents the lower surface of the flange 60 in the −Z direction from being electrically connected to the outer surface of the sealing plate 20. The protruding insulating part 56c has a cylindrical shape and protrudes from the outer end of the base 56b in the diameter direction along the circumferential surface of the flange 60 in the +Z direction. The protruding insulating part 56c faces the side surface of the flange 60. The sealing plate side insulator 56 may be a resin member or may be a member formed by coating the intended part of the positive electrode terminal 30 with resin.

The positive electrode side external conductive member 34 is a planar member formed of aluminum metal. The positive electrode side bolt 36 is used to fasten a bus bar that establishes electrical connection between the terminals of adjoining secondary battery 10. A bolt attachment part is provided to the −Y side end of the external conductive member 34 to fix the bolt 36, and the +Y side end of the external conductive member 34 is welded to the positive electrode terminal 30 to establish electrical connection therebetween.

The positive electrode terminal 30 is spaced apart from the bolt 36 in the secondary battery 10 of this embodiment, so that direct application of torque to the positive electrode terminal 30 can be prevented when the bolt 36 is fastened to a bus bar (not illustrated). Thus, this structure can suppress the lowering of the sealing performance between the positive electrode terminal 30 and the sealing plate 20 and damage of the connection between the positive electrode terminal 30 and the positive electrode current collector 16. Although the structure in which the positive electrode terminal 30 and the sealing plate 20 are electrically insulated from each other has been described, they may be electrically connected to each other on the basis of a structural requirement.

Figure 3B:
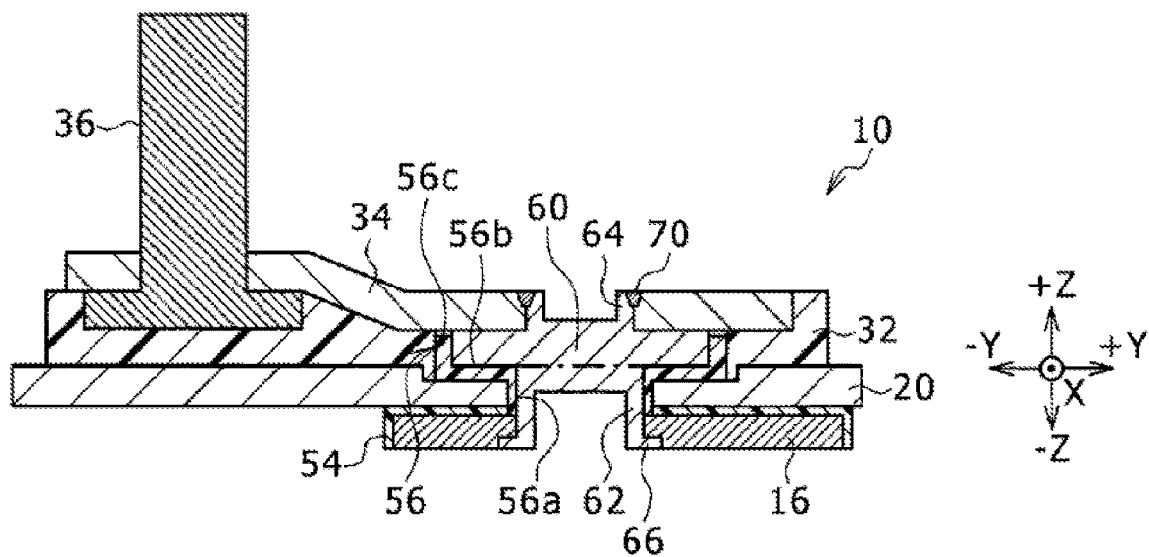
FIG. 3B is a cross sectional view taken along the line III-III in FIG. 2 and illustrating a state after the positive electrode terminal is welded to the positive electrode side exterior conductive member.

The external conductive member 34 is welded to the protrusion 64 to be electrically connected to the protrusion 64 as illustrated in FIG. 3B. The external conductive member 34 may be, for instance, welded by laser welding or resistance welding. A nugget 70 is a welded part formed by welding the external conductive member 34 to the protrusion 64. The formation of the nugget 70 is preferably within the height of the protrusion 64; and such a structure can suppress the effect of the heat of the welding on the sealing plate side insulator 56, such as a resin member, and reduce the thermal deformation of the sealing plate side insulator 56 and a change in the properties thereof.

The positive electrode terminal 30 formed of aluminum metal is connected to the external conductive member 34 formed of aluminum metal by welding the +Z side end thereof to the external conductive member 34. As a result, since the welding of the positive electrode terminal 30 is made between aluminum metals, corrosion due to the contact of different types of metal is not caused. Aluminum metals have a relatively small melting point, and heat generated by the welding between aluminum metals is therefore relatively small; in addition, aluminum metals also have a lower heat conductivity than copper metals. Thus, the effect of the welding on the positive electrode side insulating member 32, current collector side insulator 54, and sealing plate side insulator 56 formed of resin or another material can be reduced.

Figure 4:
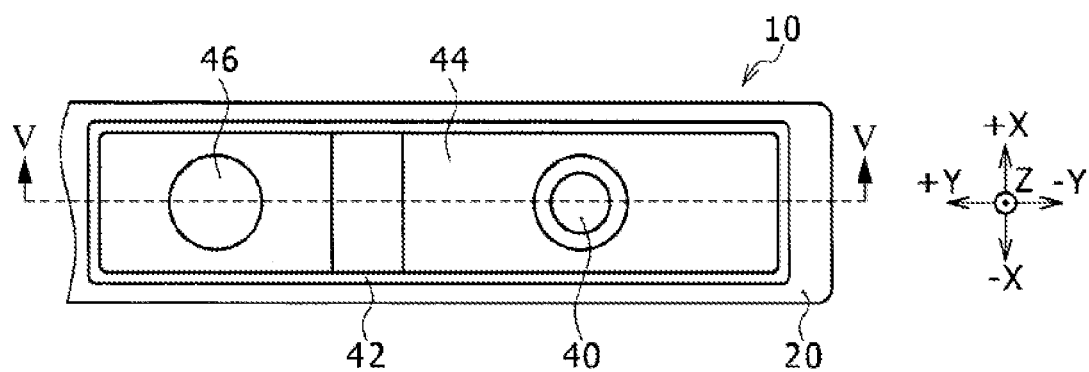
FIG. 4 is an enlarged top view partially illustrating the negative electrode terminal side of the secondary battery.

The structure on the negative electrode terminal 40 side will now be described. With reference to FIG. 4, the secondary battery 10 includes a negative electrode side insulating member 42, a negative electrode side external conductive member 44, and a negative electrode side bolt 46 on the +Z side and on the negative electrode terminal 40 side in the Y directions.

As the structure on the negative electrode side is compared with the structure on the positive electrode side with reference to FIGS. 3A, 3B, 5A, and 5B, only the structures of the terminals are greatly different from each other, and the other parts are similar to each other. In particular, only the negative electrode terminal 40 among the components on the negative electrode terminal 40 side is greatly different from the components on the positive electrode terminal 30 side, and the other components in the structure on the negative electrode side are similar to the other components in the structure on the positive electrode side.

Figure 5A:
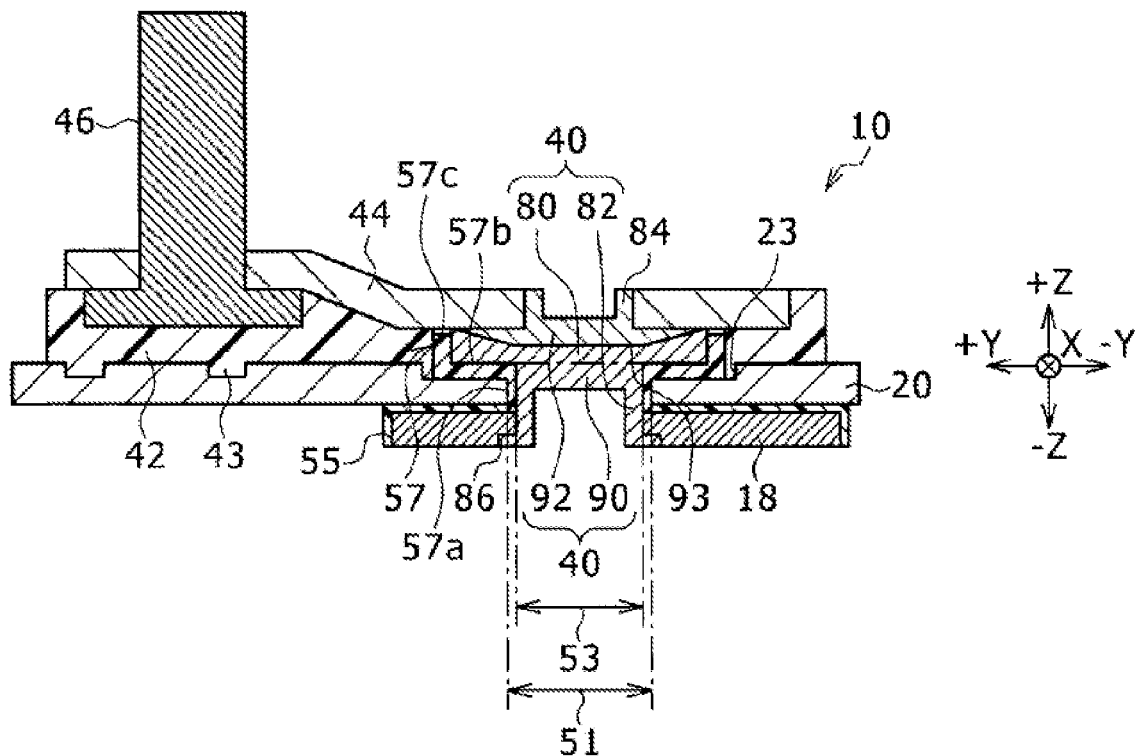
FIG. 5A is a cross sectional view taken along the line V-V in FIG. 4 and illustrating a state before a negative electrode terminal is welded to a negative electrode side exterior conductive member.
Figure 5B:
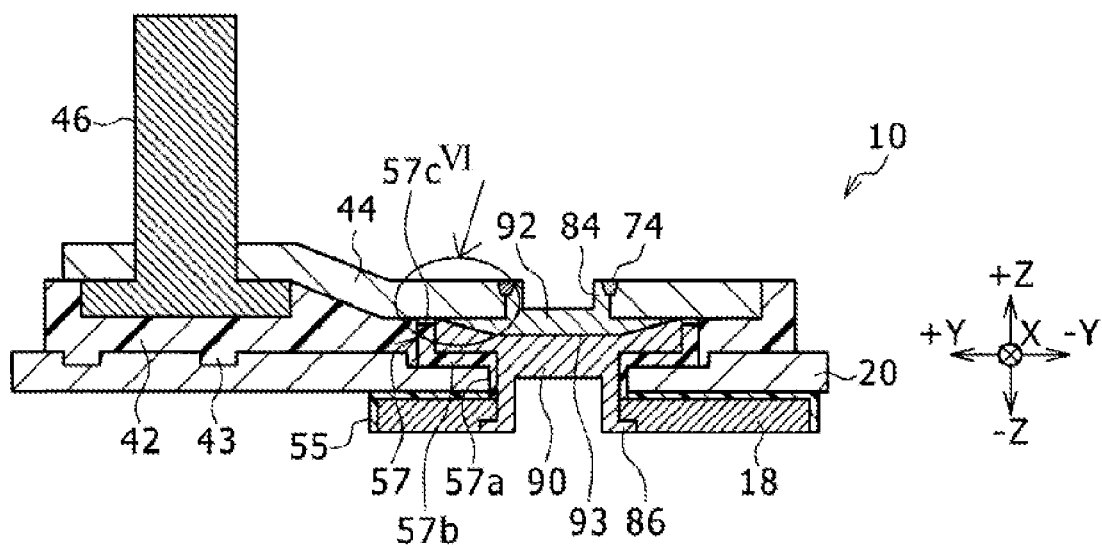
FIG. 5B is a cross sectional view taken along the line V-V in FIG. 4 and illustrating a state after the negative electrode terminal is welded to the negative electrode side exterior conductive member.

Specifically, a negative electrode terminal attachment hole 51 that is a through-hole formed in the sealing plate 20 has a similar structure to the positive electrode terminal attachment hole 50 and extends in the Z directions as illustrated in FIGS. 5A and 5B. A current collector through-hole 53 formed in the negative electrode current collector 18 has a similar structure to the current collector through-hole 52 formed in the positive electrode current collector 16. A recess 23 has a similar structure to the recess 21 described in the structure on the positive electrode side, a current collector side insulator 55 on the negative electrode side has a similar structure to the current collector side insulator 54 on the positive electrode side. A sealing plate side insulator 57 on the negative electrode side has a similar structure to the sealing plate side insulator 56 on the positive electrode side. An external conductive member 44 on the negative electrode side is a planar member formed of aluminum metal as in the external conductive member 34 on the positive electrode side. A bolt 46 on the negative electrode side has a similar structure to the bolt 36 on the positive electrode side.

A mating part 43 in which the sealing plate 20 is mated with the negative electrode side insulating member 42 is provided below the bolt 46 in the −Z direction. The mating part 43 enables a reduction in application of torque to the negative electrode terminal 40 when the bolt 46 is fastened to another member. In FIG. 3 for the positive electrode terminal 30 side, although the illustration of the mating part is omitted, a mating part in which the sealing plate 20 is mated with the positive electrode side insulating member 32 is preferably provided below the bolt 36 as in the negative electrode terminal 40 side. Since components on the negative electrode terminal 40 side have a similar structure to the corresponding components on the positive electrode terminal 30 side except for the negative electrode terminal 40, further explanation is omitted.

The negative electrode terminal 40 includes a flange 80 and a circular insertion part 82 disposed on the −Z side relative to the flange 80. The flange 80 has an outer diameter larger than the inner diameter of the negative electrode terminal attachment hole 51. The flange 80 is a brim-like part of the negative electrode terminal 40 that is disposed so as to face the outer surface of the sealing plate 20. The outer diameter of the flange 80 is smaller than the inner diameter of the recess 23 of the sealing plate 20; viewed in the Z directions, the whole body of the flange 80 is within the recess 23. Part of the negative electrode terminal 40 on the −Z side of the flange 80 includes the circular insertion part 82 and is inserted into the negative electrode terminal attachment hole 51 and the current collector through-hole 53. The negative electrode terminal 40 has a similar structure to the positive electrode terminal 30 and is insulated from the sealing plate 20. Specifically, the sealing plate side insulator 57 for the negative electrode includes an inner surface covering part 57a, a base 57b, and protruding insulating part 57c. The inner surface covering part 57a has a cylindrical shape and covers the inner surface of the negative electrode terminal attachment hole 51 of the sealing plate 20. The inner surface covering part 57a prevents the negative electrode terminal 40 from being electrically connected to the inner surface of the negative electrode terminal attachment hole 51 of the sealing plate 20. The base 57b extends outward from the +Z side end of the inner surface covering part 57a in the diameter direction and is disposed along the outer surface of the sealing plate 20. The base 57b is disposed on the bottom of the recess 23. The base 57b is disposed between the flange 80 and the outer surface of the sealing plate 20 (upper surface in the +Z direction) and prevents the lower surface of the flange 80 in the −Z direction from being electrically connected to the outer surface of the sealing plate 20 (upper surface in the +Z direction). The protruding insulating part 57c has a cylindrical shape and protrudes from the outer end of the base 57b in the diameter direction along the circumferential surface of the flange 80 in the +Z direction. The protruding insulating part 57c faces the side surface of the flange 80. The recess 23 is not necessarily provided.

The negative electrode terminal 40 is greatly different from the positive electrode terminal 30 in that it is formed of a composite material. In particular, the negative electrode terminal 40 has a first region 92 formed of an aluminum metal (aluminum or aluminum alloy) and a second region 90 formed of a copper metal (copper or copper alloy), and the first region 92 is disposed on the +Z side relative to the second region 90. The aluminum metal is an example of a first material, and the copper metal is an example of a second material. The flange 80 has a structure in which part of the first region 92 on the −Z side joins part of the second region 90 on the +Z side. The surface of the flange 80 on one side, which is the +Z side, is formed of aluminum metal; and the surface of the flange 80 on the other side, which is the −Z side, is formed of copper metal. The circular insertion part 82 is included in the second region 90.

With reference to FIG. 5A, the +Z side surface of the flange 80 has a protrusion 84, and the protrusion 84 is a welding terminal that serves to weld the negative electrode terminal 40 to the negative electrode side external conductive member 44. Although the negative electrode terminal 40 has the circular protrusion 84 in the embodiment illustrated in FIG. 5A, multiple protrusions may be provided on the same circumference so as to be spaced apart from each other in the circumferential direction, or the protrusion may have a columnar shape of which the upper surface does not have a recess. Alternatively, the protrusion 84 is not necessarily provided. The protrusion 84 is included in the first region 92 formed of aluminum metal, and the material of the protrusion 84 corresponds to the aluminum metal, which is the material of the negative electrode side external conductive member 44.

The insertion part 82 has an end 86 in the −Z direction, and the end 86 is swaged so as to expand its diameter; when it is viewed in the Z directions, the end 86 is on the negative electrode current collector 18. In this embodiment, the end 86 is a circular part having a predetermined thickness; however, the end 86 may include multiple parts spaced apart from each other in the circumferential direction and may have a columnar shape without a recess. The end 86 is included in the second region 90. The end 86 is preferably welded to the negative electrode current collector 18.

The external conductive member 44 is welded to the protrusion 84 to be electrically connected to the protrusion 84 as illustrated in FIG. 5B. The external conductive member 44 may be, for instance, welded by laser welding or resistance welding. A nugget 74 is a welded part formed by welding the external conductive member 44 to the protrusion 84. The formation of the nugget 74 is preferably within the height of the protrusion 84; such a structure can suppress the effect of the heat of the welding on the sealing plate side insulator 57 formed of a resin material or another material and reduce the thermal deformation of the sealing plate side insulator 57 and a change in the properties thereof. Welding the external conductive member 44 to the protrusion 84 can make the connection between the negative electrode terminal 40 and the external conductive member 44 securer, which gives the secondary batter battery 10 good reliability.

The boundary 93 between the first region 92 and second region 90 of the negative electrode terminal 40 is positioned on the +Z side relative the upper surface of the sealing plate 20, which is on the +Z side, and therefore not exposed to the non-aqueous electrolytic solution. Hence, even in the case where the electric potential of the negative electrode becomes low, the aluminum metal used in the first region 92 and lithium contained in the non-aqueous electrolytic solution are certainly prevented from forming an alloy.

Aluminum metals have a relatively small melting point, and heat generated by welding between aluminum metals is therefore relatively small. In addition, aluminum metals have a lower heat conductivity than copper metals. Heat generated in the welding is hard to be transmitted to the sealing plate side insulator 57 via the negative electrode terminal 40, which can reduce the thermal degradation of the sealing plate side insulator 57.

Since the boundary 93 between the first region 92 and the second region 90 is spaced apart from the end 86 that is to be swaged, application of stress to the boundary 93 due to the swaging is reduced. In this embodiment, the parts of the negative electrode terminal 40 that hold the sealing plate 20 and the negative electrode current collector 18 (lower surface of the flange 80, insertion part 82, and end 86) are formed of a copper metal that has a higher mechanical strength than aluminum metal. The negative electrode terminal 40 and the negative electrode current collector 18 can be therefore further securely fixed to the sealing plate 20.

Use of the secondary battery 10 to produce an assembled battery will now be simply described. The assembled battery is produced with a bus bar (not illustrated). The bus bar is, for example, fixed to the bolt 36 as follows. Specifically, the bus bar is formed of a conductive material such as an aluminum metal (for instance, aluminum or an aluminum alloy). The bus bar is, for instance, a plate having a rectangular shape in a planar view and has a through-hole on each of one end and the other end thereof in the longitudinal direction. The positive electrode side bolt 36 of one secondary battery 10 is inserted into the through-hole formed in one end of the bus bar, and then a nut (not illustrated) is fastened to a male screw part 79 formed on the outer surface of the bolt 36 (see FIG. 1). Then, the negative electrode side bolt 46 of another secondary battery 10 is inserted into the through-hole formed in the other end of the bus bar, and then a nut (not illustrated) is fastened to a male screw part 89 formed on the outer surface of the bolt 46 (see FIG. 1). The positive electrode terminal 30 of one secondary battery 10 is electrically connected to the negative electrode terminal 40 of another secondary battery 10 in this manner. This electrical connection is repeatedly established, so that an assembled battery (not illustrated) including the intended number of the secondary batteries 10 connected to each other in series can be produced.

In the case where multiple secondary batteries 10 are connected to each other in parallel, the positive electrode terminals 30 of two secondary batteries 10 may be electrically connected to each other with a bus bar, and the negative electrode terminals 40 of two secondary batteries 10 may be electrically connected to each other with another bus bar. An assembled battery is produced by electrically connecting multiple secondary batteries 10 to each other in parallel, series, or a combination of series and parallel in this manner. The secondary batteries 10 may be used alone.

Figure 6:
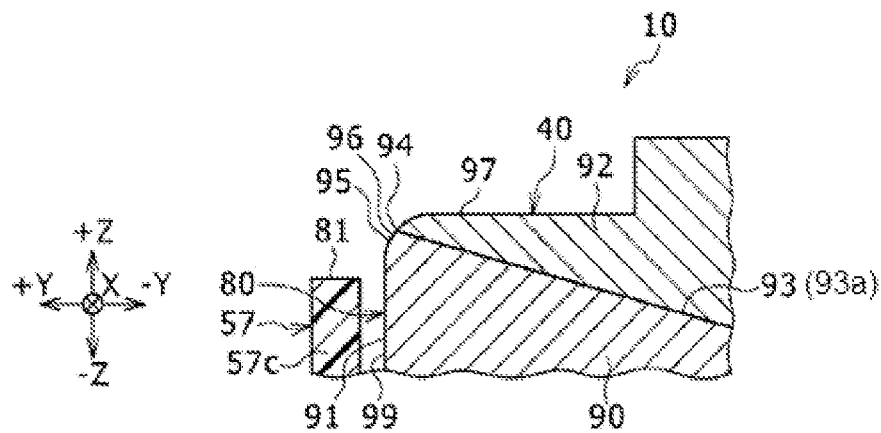
FIG. 6 is an enlarged cross-sectional view schematically illustrating a region around the outer end of the boundary between the first region and second region of the negative electrode terminal of the secondary battery and also schematically illustrating part of a flange and part of a sealing plate side insulating member in a region denoted by VI in FIG. 5B.

The positional relationship of an exposed part existing at the outer end of the boundary 93 between the first region 92 and second region 90 of the negative electrode terminal 40 will now be described. The flange 80 of the negative electrode terminal 40 faces the protruding insulating part 57c of the sealing plate side insulator 57 in the Y directions with a gap interposed therebetween as illustrated in FIG. 6. The boundary 93 is included in the flange 80. The boundary 93 includes an inclined portion 93a relative to the sealing plate 20, such that a distance between the boundary 93 and the sealing plate 20 increases toward the outer periphery of the flange 80. The boundary 93 has an exposed part 94 that is exposed to the outside, and the exposed part 94 is at a corner 95, which is the opposite corner on the periphery 91 of the flange 80 to the sealing plate 20. The corner 95 is herein defined as an outer part that is adjacent to the part at which the upper surface 97 of the flange 80 joins the side surface 99 of the flange 80. In particular, the corner 95 is defined as a region (outer part) within 2 mm from the part at which the upper surface 97 of the flange 80 joins the side surface 99 of the flange 80. The corner 95 has a round part 96 having a curved surface protruding outward. The exposed part 94 is positioned at the round part 96. The exposed part 94 is positioned on the opposite side to the electrode body 14 in the Z directions relative to the end 81 of the protruding insulating part 57c that is positioned on the opposite side to the electrode body 14 in the Z directions. Between the exposed part 94 and the insulating member 81, the second region 90 is located in an outermost surface, such as the side surface 91, of the flange 80.

Figure 7:
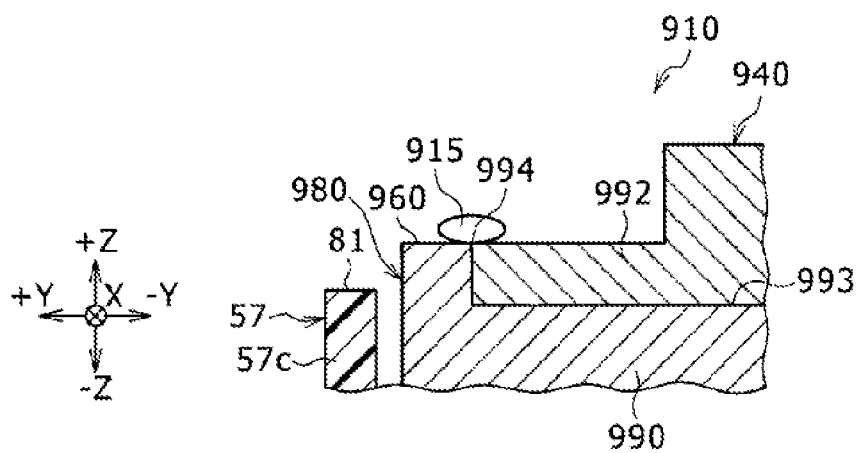
FIG. 7 is a cross-sectional view schematically illustrating a secondary battery of a first reference example in the manner of FIG. 6 to explain the problem of the secondary battery of the first reference example.

The exposed part 94, which is at the outer end of the boundary 93, is positioned at the corner 95 as illustrated in FIG. 6; and an advantage brought about by such a structure is explained on the basis of a comparison of the secondary battery 10 with a secondary battery 910 of a first reference example illustrated in FIG. 7. An aqueous solution, such as salt water, passes, for example, between the negative electrode side external conductive member 44 and the negative electrode terminal 40 in FIG. 1 and reaches the upper surface 97 (end face on the +Z side) of the flange 80 in some cases.

In such a circumstance, the secondary battery 910 of the first reference example has a negative electrode terminal 940 including a first region 992 formed of a first material and a second region 990 having a different ionization tendency from the first material as illustrated in FIG. 7. The boundary 993 between the first region 992 and the second region 990 has an exposed part 994, and the exposed part 994 is positioned on an upper surface 960 of a flange 980 so as to have a distance from a corner. An aqueous solution 915, such as salt water, is therefore likely to remain on the upper surface (a +Z side end face) 960 that faces upward in the Z directions and thus easily adheres to the exposed part 994, which readily results in the occurrence of the above-mentioned galvanic corrosion.

In the secondary battery 10 of the embodiment, since the exposed part 94 is positioned at the corner 95 on which an aqueous solution, such as salt water, is less likely to stay, the exposed part 94 is less likely to contact with an aqueous solution, such as salt water, even though the negative electrode terminal 40 has a part at which the first region 92 formed of the first material joins the second region 90 formed of the second material that has a different ionization tendency from the first material. Hence, galvanic corrosion is less likely to occur around the exposed part 94, so that the degradation of the negative electrode terminal 40 is reduced. The corner 95 corresponds to the round part 96 having a curved surface protruding outward, which enables a reduction in damage of the corner 95; in addition, it reduces the concentration of stress on the corner 95.

Figure 8:
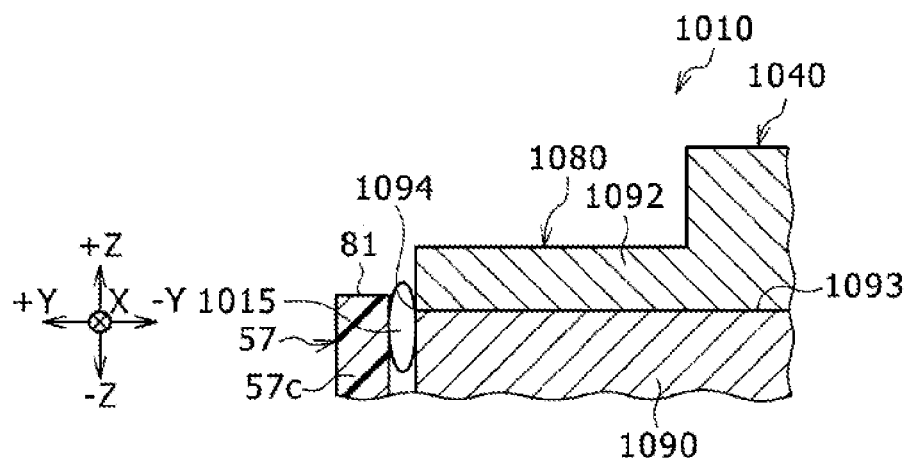
FIG. 8 is a cross-sectional view schematically illustrating a secondary battery of a second reference example in the manner of FIG. 6 to explain the problem of the secondary battery of the second reference example.

As in this embodiment, the exposed part 94 is preferably positioned on the +Z side (opposite side to the electrode body 14 in the Z directions) relative to the +Z side end 81 of the protruding insulating part 57c (end opposite to the electrode body 14 in the Z directions). Specifically, in a secondary battery 1010 of a second reference example illustrated in FIG. 8, a negative electrode terminal 1040 includes a first region 1092 formed of a first material and a second region 1090 having a different ionization tendency from the first material. The negative electrode terminal 1040 has a flange 1080, and the flange 1080 includes a boundary 1093 between the first region 1092 and the second region 1090. The boundary 1093 has an exposed part 1094, and the exposed part 1094 is positioned on the electrode body 14 side in the Z directions relative to the end 81 of the protruding insulating part 57c of the sealing plate side insulator 57, which is on the opposite side to the electrode body 14 in the Z directions. An aqueous solution, such as salt water, easily forms an aqueous solution layer 1015 in the gap between the protruding insulating part 57c and the flange 1080. In the secondary battery 1010, since the exposed part 1094 faces the protruding insulating part 57c, the aqueous solution layer 1015 readily covers the exposed part 1094. As a result, galvanic corrosion easily occurs.

In the secondary battery 10 of the embodiment, the exposed part 94 is positioned on the +Z side relative to the +Z side end 81 of the protruding insulating part 57c, and thus the exposed part 94 does not contact with the aqueous solution layer that is likely to be generated between the protruding insulating part 57c and the flange 80. Hence, galvanic corrosion can be further effectively reduced.

Note that the present disclosure is not limited to the aforementioned embodiment or modifications thereof, and various improvement or modifications thereof can be made within the scope of the claims of the present application or a scope equivalent thereto.

Figure 9:
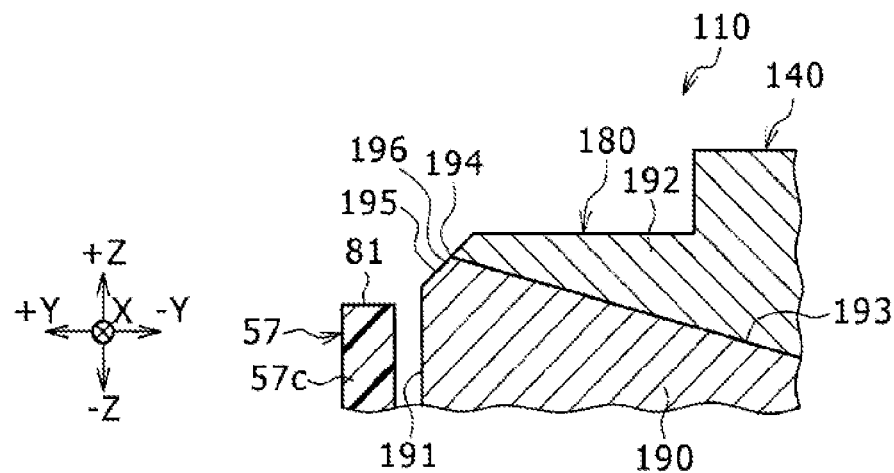
FIG. 9 is a cross-sectional view schematically illustrating a secondary battery of a first modification in the manner of FIG. 6.

In the aforementioned embodiment, for instance, the exposed part 94 is positioned at the round part of the corner 95 of the negative electrode terminal 40; however, as illustrated in FIG. 9, a negative electrode terminal 140 of a secondary battery 110 may have a joint part at which a first region 192 formed of the first material joins a second region 190 formed of a second material having a different ionization tendency from the first material. A boundary 193 between the first region 192 and the second region 190 may be included in a flange 180 of the negative electrode terminal 140, and the exposed part 194 of the boundary 193 may be positioned at a corner 195, which is opposite to the sealing plate 20, on the periphery 191 of the flange 180. The corner 195 may have a C-plane part 196 that is an inclined surface that obliquely inclines to Z directions, and the exposed part 194 may be positioned at the C-plane part 196.

In this modification, since the C-plane part 196, at which the exposed part 194 is positioned, inclines obliquely downward as it goes toward the end in the +Y direction, an aqueous solution, such as salt water, is likely to move downward on the C-plane part 196 because of gravity; thus the aqueous solution is less likely to stay on the C-plane part 196. Hence, the aqueous solution is less likely to adhere to the exposed part 194 as in the embodiment in which the exposed part 94 is positioned at the round part 96, which can reduce the occurrence of galvanic corrosion around the exposed part 194. Also in this modification, the exposed part 194 is preferably positioned on the opposite side to the electrode body 14 in the Z directions relative to the end 81 of the protruding insulating part 57c of the sealing plate side insulator 57 in the negative electrode as in the embodiment, the end 81 being on the opposite side to the electrode body 14 in the Z directions. In this case, the occurrence of galvanic corrosion can be further effectively reduced.

Figure 10:
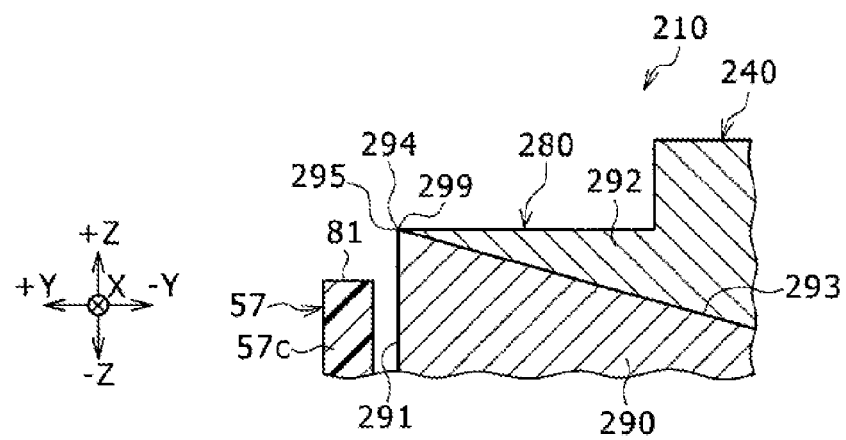
FIG. 10 is a cross-sectional view schematically illustrating a secondary battery of a second modification in the manner of FIG. 6.

As illustrated in FIG. 10, a negative electrode terminal 240 of a secondary battery 210 may include a joint part at which a first region 292 formed of a first material joins a second region 290 formed of a second material having a different ionization tendency from the first material. A boundary 293 between the first region 292 and the second region 290 may be included in a flange 280 of the negative electrode terminal 240. Furthermore, as illustrated in FIG. 10, the flange 280 may have an angular part 299, which is a sharp edge on Y-Z cut plane, on the opposite side to the sealing plate 20 on a periphery 291 of the flange 280, and an exposed part 294 of the boundary 293 may be positioned at the corner 295 including the angular part 299. Moreover, the exposed part 294 is preferably positioned on the opposite side to the electrode body 14 in the Z directions relative to the end 81 of the protruding insulating part 57 c of the sealing plate side insulator 57 in the negative electrode as in the embodiment, the end 81 being on the opposite side to the electrode body 14 in the Z directions.

Since the exposed part 294 is positioned at the corner 295 on which an aqueous liquid is likely to be dropped but less likely to stay, the exposed part 294 is less likely to suffer from the occurrence of galvanic corrosion due to the aqueous solution staying on the upper surface of the flange 280 also in this modification. In addition, since the exposed part 294 is positioned on the +Z side relative to the +Z side end 81 of the protruding insulating part 57c, the occurrence of the corrosion of the exposed part 294 due to an aqueous solution layer readily generated between the protruding insulating part 57c and the flange 980 can be reduced. Thus, the degradation of the negative electrode terminal 240 resulting from the galvanic corrosion can be reduced.

Figure 11:
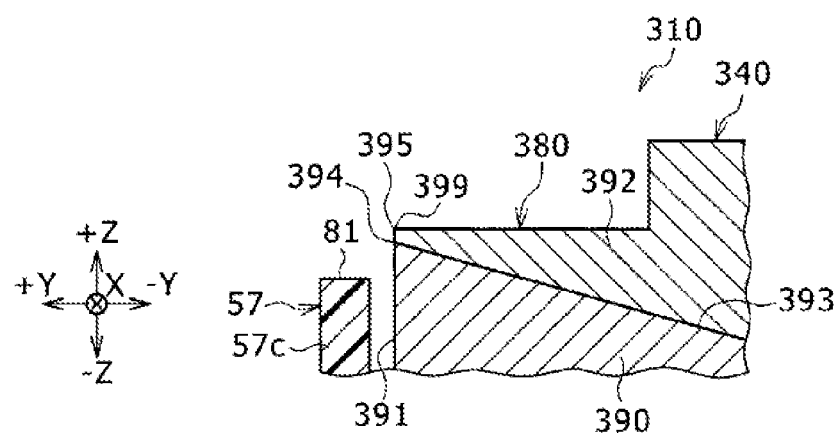
FIG. 11 is a cross-sectional view schematically illustrating a secondary battery of a third modification in the manner of FIG. 6.

As illustrated in FIG. 11, a negative electrode terminal 340 of a secondary battery 310 may include a joint part at which a first region 392 formed of a first material joins a second region 390 formed of a second material having a different ionization tendency from the first material. A boundary 393 between the first region 392 and the second region 390 may be included in a flange 380 of the negative electrode terminal 340. Furthermore, as illustrated in FIG. 11, the flange 380 may have an angular part 399, which is a sharp edge on Y-Z cut plane, on the opposite side to the sealing plate 20 on a periphery 391 of the flange 380, and the angular part 399 may be the part at which the upper surface of the flange 380 joins the side surface of the flange 380. The boundary 393 has an exposed part 394 that is exposed to the outside, and the exposed part 394 may be positioned at a corner 395 that is a region within 2 mm from the angular part 399. The exposed part 394 may be positioned on the side surface of the flange 380 and on the +Z side relative to the +Z side end 81 of the protruding insulating part 57c. Alternatively, unlike to the modification illustrated in FIG. 11, the exposed part that is exposed to the outside at the boundary between the first region and the second region does not need to be included in the corner. Such an exposed part, which is not included in the corner, may be positioned on the side surface of the flange and on the upper surface side of the flange relative to the end of the protruding insulating part that is on the upper surface side of the flange.

Also in this modification, an aqueous solution staying on the upper surface of the flange 380 is less likely to adhere to the exposed part 394, and an aqueous solution layer, which is easily generated between the protruding insulating part 57c and the flange 380, is also less likely to adhere to the exposed part 394. Thus, the degradation of the negative electrode terminal 340 resulting from the galvanic corrosion can be reduced.

In the embodiment, the corner 95 of the flange 80 smoothly joins the upper surface 97 of the flange 80 that extends in the direction substantially orthogonal to the Z directions. The negative electrode terminal, however, may have a protrusion that protrudes from the upper surface of the flange in the +Z direction.

Figure 12:
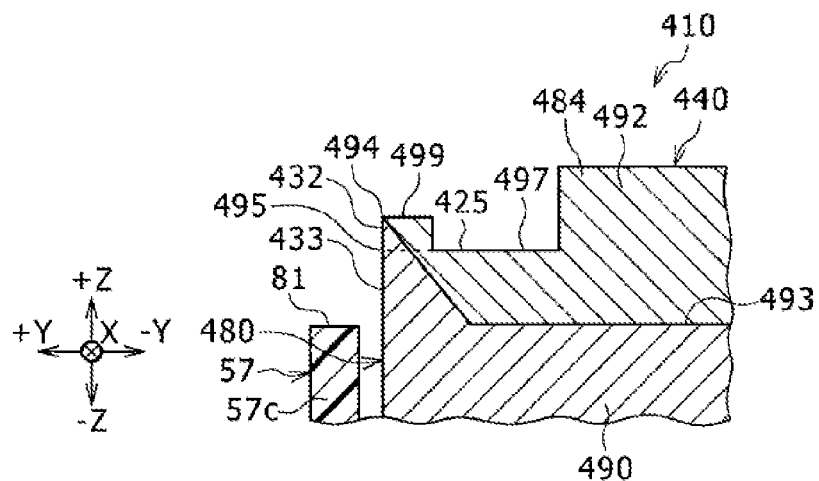
FIG. 12 is a cross-sectional view schematically illustrating a secondary battery of a fourth modification in the manner of FIG. 6.

Specifically, as illustrated in FIG. 12, a negative electrode terminal 440 of a secondary battery 410 may include a joint part at which a first region 492 formed of a first material joins a second region 490 formed of a second material having a different ionization tendency from the first material. The negative electrode terminal 440 has a flange 480, and the flange 480 may have a protrusion 499 that protrudes in the +Z direction from an upper surface 497 thereof (end surface on the +Z side in the Z directions). The protrusion 499 may protrude in the +Z direction from an outer end of the upper surface 497 in the diameter direction. The protrusion 499 may be positioned near a part 495 at which the upper surface of the flange 480 joins the side surface of the flange 480. An outer surface 432 of the protrusion 499 may smoothly extend so as to be flush with an outer surface 433 of the flange 480 and may be integrated with the outer surface 433. The boundary 493 has an exposed part 494, and the exposed part 494 may be included in the protrusion 499. The exposed part 494 of the boundary 493 is preferably positioned on the +Z side relative to the +Z side end 81 of the protruding insulating part 57c. In FIG. 12, a protrusion 484 is provided on the +Z side surface of the flange 480 on the inside in the diameter direction and is a welding terminal that is used to weld the negative electrode terminal 440 to the negative electrode side external conductive member (not illustrated).

In this modification, since the exposed part 494 is included in the protrusion 499, the distance between the exposed part 494 and the +Z side end 81 of the protruding insulating part 57c in the Z directions can be longer as compared with the case where the protrusion 499 is not provided. Thus, an aqueous solution layer that is readily generated between the protruding insulating part 57c and the flange 480 can be securely prevented from contacting with the exposed part 494.

Since the protrusion 499 protrudes in the +Z direction from the outer side of the upper surface 497 of the flange 480 in the diameter direction, a recess 425 can be formed inside of the protrusion 499 in the diameter direction. An aqueous solution can be therefore retained in the recess 425; as a result, the aqueous solution is hard to exceed the side wall of the recess 425 and thus less likely to reach the corner of the protrusion 499. Accordingly, the galvanic corrosion of the exposed part 494 can be reduced also for this reason.

Figure 13:
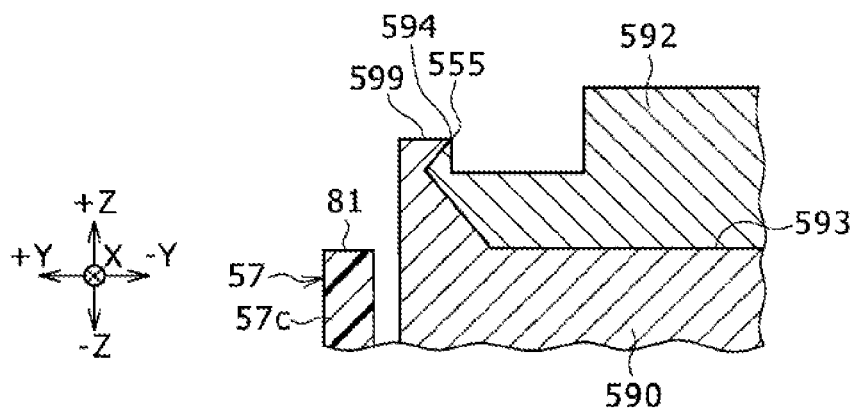
FIG. 13 is a cross-sectional view schematically illustrating a secondary battery of a fifth modification in the manner of FIG. 6.
Figure 14:
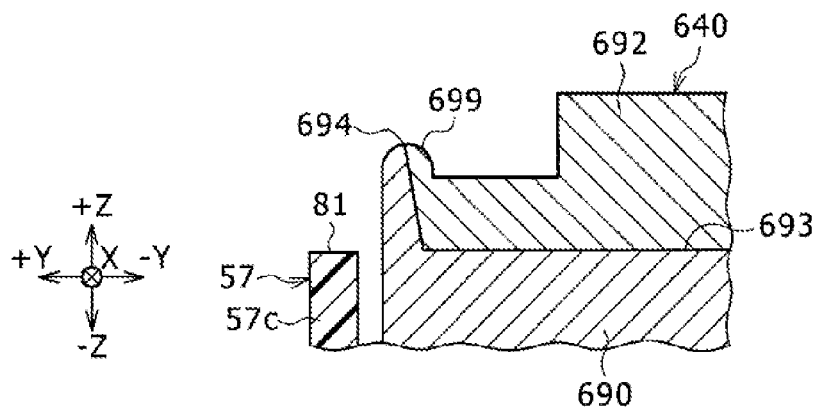
FIG. 14 is a cross-sectional view schematically illustrating a secondary battery of a sixth modification in the manner of FIG. 6.
Figure 15:
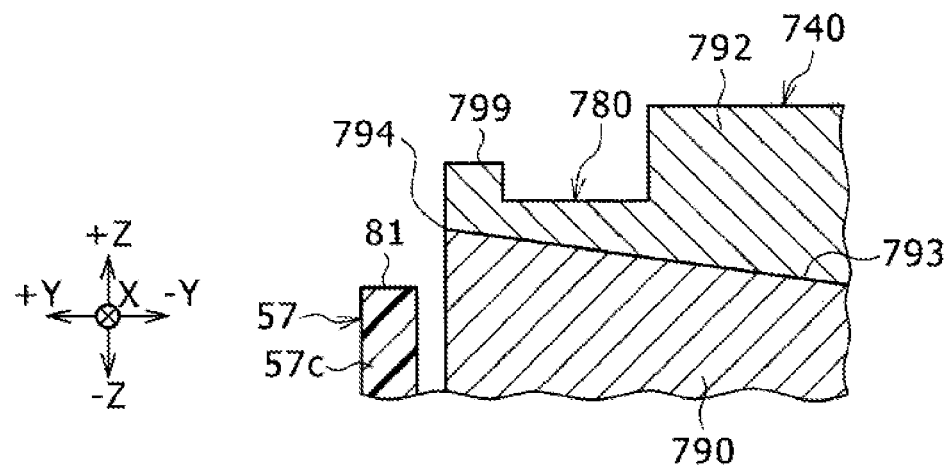
FIG. 15 is a cross-sectional view schematically illustrating a secondary battery of a seventh modification in the manner of FIG. 6.

As illustrated in FIG. 13, an exposed part 594 at a boundary 593 between a first region 592 and a second region 590 may be included in an inner part 555 on the upper surface of a protrusion 599 in the diameter direction. Alternatively, as illustrated in FIG. 14, a protrusion 699 of a negative electrode terminal 640 may have an end with a curved surface protruding in the +Z direction so that the curved surface enables an aqueous solution, such as salt water, to easily drop downward from the end of the protrusion 699. Furthermore, an exposed part 694 of a boundary 693 between a first region 692 and a second region 690 may be positioned at the end of the protrusion 699. Alternatively, as illustrated in FIG. 15, an exposed part 794 of a boundary 793 between a first region 792 and a second region 790 in a negative electrode terminal 740 may be positioned on the side surface (outer surface) of a flange 780 and on the +Z side relative to the +Z side end 81 of the protruding insulating part 57c. Specifically, the exposed part 794 may be positioned on the outer surface of the negative electrode terminal 740 on the −Z side relative to the protrusion 799 and on the +Z side relative to the +Z side end 81 of the protruding insulating part 57c. Also in this case, the protrusion 799 enables an increase in the distance in the Z directions between the +Z end 81 of the protruding insulating part 57c and the exposed part 794. Thus, as compared with the case where the protrusion 799 is not provided, the exposed part 794 can be effectively prevented from contacting with an aqueous solution layer that is easily generated between the protruding insulating part 57c and the flange 780, so that the galvanic corrosion of the negative electrode terminal 740 can be reduced.

In the above explanation, the first material used for forming the first region 92 is aluminum or an aluminum alloy, and the second material used for forming the second region 90 is copper or a copper alloy (copper alloy contains metal in which copper is plated with nickel). The first material used for forming the first region and the second material used for forming the second region are, however, not limited thereto and can be any combination of conductive materials having different ionization tendency. The second material used for forming the second region can be, for example, nickel or stainless steel instead of a copper metal.

Figure 16:
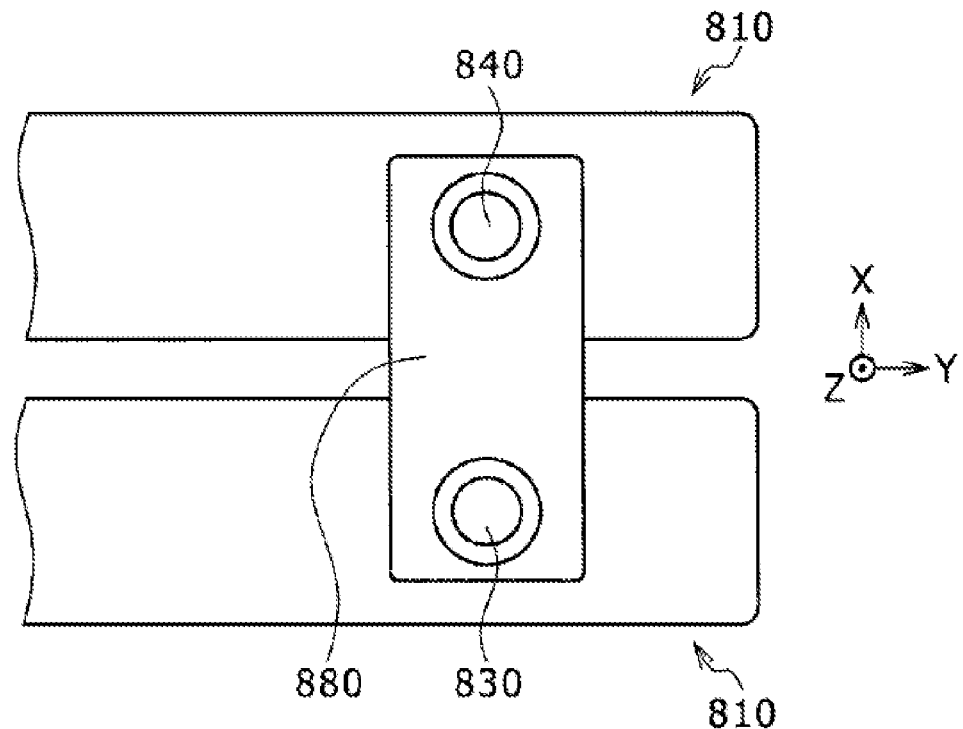
FIG. 16 is a plain view schematically illustrating two secondary batteries in which the positive electrode terminal of one secondary battery is in electrical connection with the negative electrode terminal of the other secondary battery via a bus bar.

In the above explanation, two secondary batteries 10 are electrically connected to each other via the bolts 36 and 46, a bus bar as a conductive member, and a nut to form an assembled battery. As illustrated in FIG. 16, however, a secondary battery 810 may have a structure without a bolt. One end of a bus bar 880 as a conductive member in the longitudinal direction may be, for instance, connected to a positive electrode terminal 830 of one secondary battery 810; and the other end of the bus bar 880 in the longitudinal direction may be connected to a negative electrode terminal 840 of another secondary battery 810. In this case, the bus bar 880 may be formed of an aluminum metal (aluminum or aluminum alloy). The bus bar 880 is preferably a plate having a rectangular shape in a planar view and has a through-hole on each of one end and the other end thereof in the longitudinal direction. The positive electrode terminal 830 of one secondary battery 810 is inserted into a through-hole formed in one end of the bus bar 880, and then such one end of the bus bar 880 may be fixed to the positive electrode terminal 830 of this secondary battery 810 by welding such as laser welding. The negative electrode terminal 840 of another secondary battery 810 is inserted into a through-hole formed in the other end of the bus bar 880, and then this end of the bus bar 880 may be fixed to the negative electrode terminal 840 of this secondary battery 810 by welding such as laser welding. Alternatively, a bus bar having no through-holes may be used, and a planar bus bar may be placed on an electrode terminal (positive electrode terminal or negative electrode terminal) and then subjected to piercing welding to electrically connect the bus bar to the electrode terminal. As in the formation of an assembled battery of the secondary batteries 10 having the bolts 36 and 46, multiple secondary batteries 810 having no bolts can be electrically connected to each other in parallel, series, or a combination of parallel and series to form an assembled battery. Such multiple secondary batteries 810 having no bolts can be used alone.

The shape of the flange in a planar view is not particularly limited. The shape of the flange in a planar view may be quadrangular or circular. In the case where the shape of the flange is quadrangular in a planar view, the corner thereof may be cut into a round shape or C-plane cut.

In the above description of the embodiment and modifications, terminals having the first regions 92, 192, 292, 392, 492, 592, 692, and 792 and the second regions 90, 190, 290, 390, 490, 590, 690, and 790, which are formed of materials having different ionization tendencies, are the negative electrode terminals 40, 140, 240, 340, 440, 640, 740, and 840, respectively. The terminal having the first region and second region that are formed of materials having different ionization tendencies may be a positive electrode terminal alone or may be both the negative electrode terminal and the positive electrode terminal.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A secondary battery comprising:
   an exterior package having an opening at one end in a height direction;
   a sealing plate that seals the opening and that has a through-hole;
   an electrode body that is disposed inside the exterior package and that includes a positive electrode and a negative electrode; and
   a terminal that is inserted into the through-hole to be electrically connected to the positive electrode or the negative electrode, wherein
   the terminal has a first region formed of a first material and a second region formed of a second material having a different ionization tendency from the first material;
   the terminal has a flange having an outer diameter larger than an inner diameter of the through-hole;
   the flange is disposed so as to face an outer surface of the sealing plate;
   an insulating member is disposed between the flange and the outer surface of the sealing plate; and
   a boundary between the first region and the second region has an exposed part that is exposed to the outside, and the exposed part is positioned at an opposite corner on an outer periphery of the flange to the sealing plate,
   wherein the boundary includes an inclined portion relative to the sealing plate, such that a distance between the boundary and the sealing plate increases toward the outer periphery of the flange,
   wherein at least part of the second region is located between the first region and the sealing plate,
   wherein in the terminal, the second region is extending through the through-hole, and
   wherein between the exposed part and the insulating member, the second region is located in an outermost surface of the flange.

2. The secondary battery according to claim 1, wherein the first material is aluminum or an aluminum alloy, and the second material is copper or a copper alloy.

3. The secondary battery according to claim 1, wherein the corner has a round part having a curved surface protruding outward, and
   the exposed part is positioned at the round part.

4. The secondary battery according to claim 1, wherein the corner has a C-plane part having an inclined surface that is obliquely inclined to the height direction, and
   the exposed part is positioned at the C-plane part.

5. The secondary battery according to claim 1, wherein an upper surface of the flange has a protrusion formed adjacent to a part at which the upper surface of the flange joins a side surface of the flange, and
   the exposed part is included in the protrusion.

6. The secondary battery according to claim 1, wherein the insulating member has a base disposed along the outer surface of the sealing plate and a protruding insulating part that protrudes from the base and that faces a side surface of the flange.

7. The secondary battery according to claim 1, wherein the outermost surface of the flange includes a side surface of the flange.

8. A secondary battery comprising:
   an exterior package having an opening at one end in a height direction;
   a sealing plate that seals the opening and that has a through-hole;
   an electrode body that is disposed inside the exterior package and that includes a positive electrode and a negative electrode; and
   a terminal that is inserted into the through-hole to be electrically connected to the positive electrode or the negative electrode, wherein
   the terminal has a first region formed of a first material and a second region formed of a second material having a different ionization tendency from the first material;
   the terminal has a flange having an outer diameter larger than an inner diameter of the through-hole;
   the flange is disposed so as to face an outer surface of the sealing plate;
   an insulating member is disposed between the flange and the outer surface of the sealing plate;
   the insulating member has a base disposed along the outer surface of the sealing plate and a protruding insulating part that protrudes from the base and that faces a side surface of the flange;
   a boundary between the first region and the second region has an exposed part that is exposed to the outside, and the exposed part is positioned on the side surface of the flange; and
   the exposed part is positioned on an upper surface side of the flange relative to an end of the protruding insulating part that is on the upper surface side of the flange,
   wherein at least part of the second region is located between the first region and the sealing plate,
   wherein in the terminal, the second region is extending through the through-hole, and
   wherein between the exposed part and the insulting member, the second region is located in an outermost surface of the flange.

9. The secondary battery according to claim 8, wherein the first material is aluminum or an aluminum alloy, and the second material is copper or a copper alloy.

10. The secondary battery according to claim 8, wherein the outermost surface of the flange includes the side surface of the flange.

* * * * *